Figure 1:
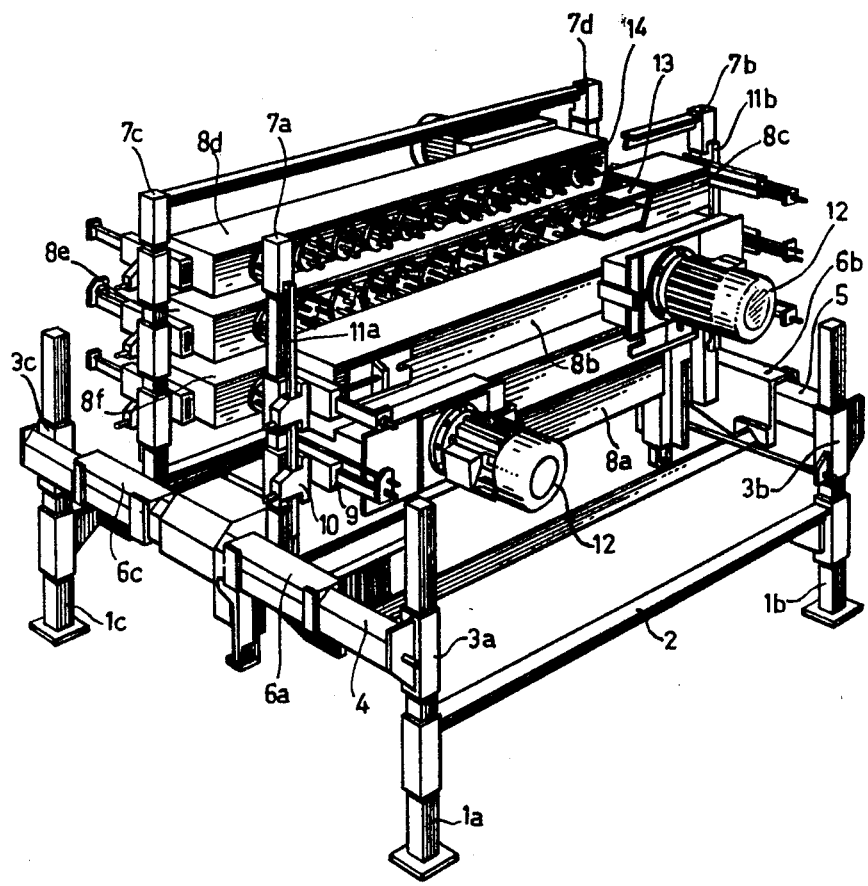

United States Patent

[11] 3,596,309

[72] Inventor Jacobus Gerardus Vertegaal
Boxmeer, Netherlands
[21] Appl. No. 782,903
[22] Filed Dec. 11, 1968
[45] Patented Aug. 3, 1971
[73] Assignee Stork Amsterdam N. V.
Amsterdam, Netherlands
[32] Priority Oct. 24, 1968
[33] Netherlands
[31] 6815188

[54] POULTRY-PLUCKING MACHINE
1 Claim, 5 Drawing Figs.
[52] U.S. Cl. .................................................. 17/11.1
[51] Int. Cl. ................................................. A22c 21/02
[50] Field of Search....................................... 17/11.1

[56] References Cited
UNITED STATES PATENTS
3,273,198 9/1966 Tomlinson.................. 17/11.1
3,277,515 10/1966 Engkjer et al................ 17/11.1
3,471,893 10/1969 Zebarth et al. .............. 17/11.1
3,483,589 12/1969 Smorenburg................. 17/11.1

*Primary Examiner*—Lucie H. Laudenslager
*Attorney*—Waters, Roditi, Schwartz & Nissen ABSTRACT: A poultry-plucking machine is provided with a number of rotating plucking discs each with axially protruding elastic plucking fingers. The discs are supported by substantially identical, oblong, prismatic carriers which each support a number of plucking discs lying in the longitudinal direction of the carrier, while each carrier is provided with a driving motor for driving the plucking discs. The carriers are accommodated in a frame such that they are easily detachable and that both the level of the respective carriers, their mutual distance and their angular position can be adjusted at will.

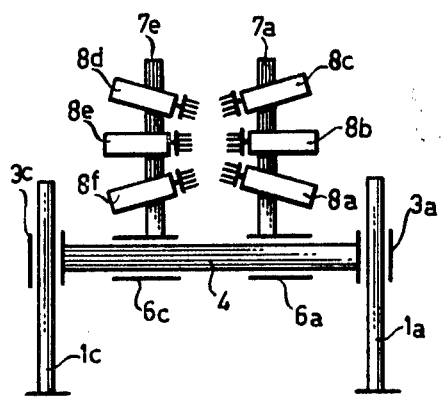
FIG: 2.
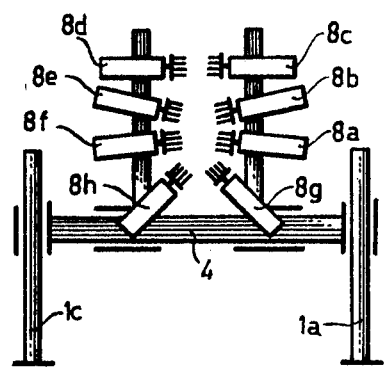
FIG: 3.
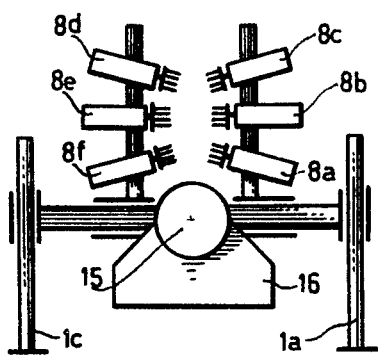
FIG: 4.
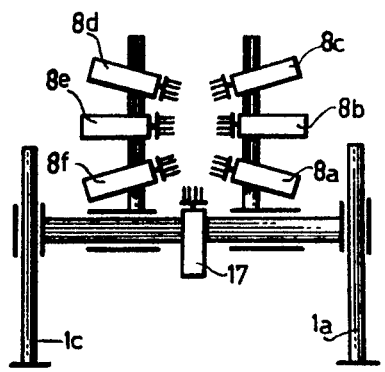
FIG: 5.

POULTRY-PLUCKING MACHINE

My invention relates to a poultry-plucking machine comprising a number of rotating plucking discs, with axially protruding elastic plucking fingers arranged in oppositely situated rows at different levels and directed in the path of travel of the poultry.

Devices of this kind are known per se. These known devices are, however, only suited for treating one definite kind of poultry which should have a particular size. It is only to a limited extent, or not at all, possible to direct and adjust the plucking discs in such a way that a particular machine can be adapted with a few operations to the treatment of a kind of poultry different from that for which the machine is designed.

It is an object of my invention to provide a device of the above-mentioned kind which can be universally used, so that it is not necessary to purchase different machines for the treatment of different kinds of poultry. It is a further object of my invention to provide a machine which is constructed in a simple and logical way and which can be easily maintained and which, in case of a breakdown of certain parts, can be put into operation again within a short time by a simple and speedy replacement of the defective units.

A device according to my invention is characterized in that the plucking discs are supported by substantially identical oblong prismatic carriers each supporting a number of plucking discs substantially aligned in the longitudinal direction of the carrier, each carrier being provided with a driving motor for driving the plucking discs which are mutually coupled and also coupled to the motor, the carriers being furthermore incorporated in a frame in such a manner that they are easily detachable, the arrangement being such that both the level of the respective carriers and their mutual distance and their angular position can be adjusted at will.

Due to this construction in which the machine consists of a number of identical units each having their own drive, it becomes possible to adapt an existing machine in a fast and simple way to the treatment of an arbitrary kind of poultry by adding or removing one or more carriers with plucking discs which each have their own driving motor. Due to the wide range of adjustment of the position of the plucking fingers and excellent adaptation to the shape of the poultry which can be achieved, the plucking effect is considerably improved. The maintenance of the machine is very simple; when one of the units becomes inoperative, this unit can quickly be removed and replaced with another one. It is evident that the complete apparatus can be constructed in such a way that this replacement can be carried out with a minimum of loss of time, whereby the handling of the poultry, which is effected in a continuous process, is interrupted for a minimum period of time.

The frame is preferably constructed in such a way that at the lower end thereof a plucking drum or a plucking disc carrier provided with radical plucking fingers can be disposed between the carriers of the plucking discs.

Due to this feature, the device according to the invention has a wider field of use for, although the function of such a plucking drum can to an extent, be performed by the lower rows of plucking discs, which for that purpose are arranged at an inward slant, it may be advantageous in the handling of certain kind of poultry when such a plucking drum is present.

In a preferred embodiment of my invention, each carrier is connected via an intermediate piece which permits a transverse displacement by its ends to a support in such a way that it can be tilted about its longitudinal axis, while these supports, at an adjustable height, are supported by vertical supporting posts which are incorporated in the frame.

The frame comprises preferably four supporting legs which, at an adjustable height, support two supporting bars which are perpendicular to the path of movement of the poultry and to which, at an adjustable distance from the supporting legs, the vertical supporting posts are secured.

A more complete understanding of my invention, and of further objects and features thereof can be obtained from the following description of illustrative embodiments thereof, when considered in connection with the accompanying drawings, wherein:

FIG. 1 is a perspective view of a device according to the invention, certain parts being removed; and FIGS. 2 to 5 are diagrammatical representations of various possibilities of arrangement of the device according to the invention.

The device shown in the drawing consists of a frame with four vertical supporting legs 1a...1d, the legs 1a and 1b as well as the legs 1c and 1d being interconnected by a crossbar 2. A guide shoe 3a...3d is movable along each leg, the arrangement being such that these guide shoes can be fixed in position on the legs 1a...1d at a certain desired level. The guide shoes 3a and 3c support the crossbar 4; the guide shoes 3b and 3d support the crossbar 5. Provided along these crossbars 4 and 5 are the guide shoes 6a...6d to which vertical supporting posts 7a to 7d are secured.

The oblong prismatic carriers which carry the plucking discs are all identical, and are denoted by 8a...8h, and are secured between the supporting posts 7a and 7b, 7c and 7d, respectively. For that purpose each plucking disc carrier is at its two ends provided with an intermediate piece 9 constructed in such a way that the carrier concerned is capable of movement in a direction transverse to its longitudinal axis with respect to the intermediate pieces. Each intermediate piece is, in a way not shown, connected with a support 10 so as to be capable of tilting around the longitudinal axis of the carrier, the supports 10 being provided along the respective posts 7a...7d. The level at which a particular support can be fixed in position is adjustable. For that purpose the racks 11a...11d can be used.

Each plucking disc carrier 8 is provided with an individual electric motor 12, which, via a driving belt 13 (visible in the carrier 8c which is shown partly cut away) drives the various plucking discs. Obviously the drive of the plucking discs can also be effected in another suitable way.

There are many possibilities of adjusting the carriers with the plucking discs. Thus, for instance the transverse distance of the supporting posts 7a and 7b, and the supporting posts 7c and 7d, respectively can be adjusted with respect to the path of the poultry by displacing the guide shoes 6a...6d along the crossbars 4, 5 and fixing them in the right place.

As a result not only can the desired mutual spacing, as necessary for the handling of a certain kind of poultry, be adjusted, but also are the checking and cleaning of the machine is facilitated, because the adjusted angular position and the levels of the various carriers are retained.

The height of all the carriers can be varied by moving the guide shoes 3a...3d along the supporting legs 1a...1d. Moreover each carrier can additionally be adjusted in transverse direction by means of the intermediate pieces 9, while further the angular position of each carrier with respect to the vertical plane can be individually regulated.

FIGS. 2 to 5 show some examples of possible arrangements of the carriers with plucking discs. FIGS. 2, 3 and 5 show embodiments wherein only carriers with plucking discs are employed, while FIG. 4 shows how the frame can be provided with a plucking drum 15, the longitudinal axis of which is located in the direction of movement of the poultry, which, together with its drive (not shown) is accommodated in a holder 16 which is detachably provided in the frame and adjustable in a vertical direction.

As is illustrated in FIG. 5, it is possible to arrange instead of a plucking drum with radial plucking fingers, a carrier 17 with plucking discs between two rows of plucking drums, the arrangement being such that the plucking fingers are directed from below toward the space between the laterally arranged plucking discs.

It is obvious from FIG. 1 that it is easy to remove one or more complete plucking disc carriers with their drive, when the production track in which the plucking device is arranged is to be changed over to the handling of another kind of poultry, or in the case of a breakdown.

A particular carrier can be removed while retaining the adjusted position of the supports 10 and the intermediate pieces 9, so that the new carrier assumes exactly the same position.

Maintenance of the plucking discs, the bearings and drive thereof need no longer be performed on the machine itself. When, for instance, the user has a spare carrier this can, according to a certain schedule, replace one by one the various plucking disc carriers of the machine, while the replaced carriers can then one by one be checked and if necessary repaired in the workshop.

Having thus described my invention what I claim as new and desire to be secured by Letters Patent is:

1. A poultry-plucking machine comprising more than two elongated carriers, said carriers being substantially identical and distributed in a plurality in parallel superposed relation on each of two opposite sides of a path of travel of the poultry, a row of rotatable plucking discs on each carrier, the rows being at different levels aligned in the longitudinal direction of the carriers, the plucking discs being at both sides of the path of travel of the poultry and directed theretowards, a driving motor mounted in each carrier, means coupling the discs in each row for common drive from the respective driving motor, said carriers all being substantially identical, a frame including a pair of vertical posts at each of the sides of the path of travel of the poultry, one of each pair of posts being positioned at each of the ends of the carriers, an intermediate piece for each carrier slidably supporting the respective carrier on a respective post for lateral movement, supports slidable vertically on said posts and each pivotably supporting a respective one of the intermediate pieces, a horizontal cross bar at each of the opposite ends of the carriers, guide shoes secured to said posts and slidably supported on said cross bars for horizontal travel thereon, a pair of vertical supporting legs at each of the sides of the path of travel of the poultry, and guide shoes on the ends of said crossbars slidably connecting each crossbar to two vertical legs for vertical travel on the vertical legs.